United States Patent [19]

Mehnert

[11] Patent Number: 5,103,126
[45] Date of Patent: Apr. 7, 1992

[54] TRANSMISSION GUIDED BY STATIONARY CURVED SPINDLE

[76] Inventor: Walter Mehnert, Grillparzer Strasse 6, 8012 Ottobrunn, Fed. Rep. of Germany

[21] Appl. No.: 638,923

[22] Filed: Jan. 9, 1991

[30] Foreign Application Priority Data

Jan. 10, 1990 [DE] Fed. Rep. of Germany ........ 4000555

[51] Int. Cl.⁵ .................... H02K 7/06; E05F 11/40
[52] U.S. Cl. ........................ 310/80; 49/359; 49/362; 74/89.15; 411/424
[58] Field of Search ............ 74/89.15, 424.8 R; 310/12, 80, 82; 411/411, 424; 49/349, 362

[56] References Cited

U.S. PATENT DOCUMENTS

| 4,167,834 | 9/1979 | Pickles | 49/349 |
| 4,409,905 | 10/1983 | Zerbi | 49/362 |
| 4,905,413 | 3/1990 | Kuki et al. | 49/362 |
| 5,012,613 | 5/1991 | Sekine | 49/349 |

FOREIGN PATENT DOCUMENTS 731943 1/1943 Fed. Rep. of Germany.
3427482 2/1985 Fed. Rep. of Germany.
211122 6/1972 France.

Primary Examiner—Steven L. Stephan
Assistant Examiner—D. L. Rebsch
Attorney, Agent, or Firm—Sughrue, Mion, Zinn Macpeak & Seas

[57] ABSTRACT

A structure which is of the utmost simplicity, rigidity and reliability has a transmission arrangement (1) for converting the rotary movement of a motor into a linear movement of a driven body (21) along a curved path. It is of a configuration that includes a stationarily arranged spindle (2) which is curved to correspond to the shape of the curved path, and at least one thread counterpart portion (4) which is engaged with the thread of the curved spindle and which is rotatable about the spindle, and by virtue of that rotary movement, displaceable in the longitudinal direction of the spindle. The stator (14) of the motor is connected to the driven body and is mounted non-rotatably and longitudinally displaceably with respect to the curved spindle, and the rotor (5, 15) of the motor is non-rotatably connected to the thread counterpart portion.

12 Claims, 2 Drawing Sheets

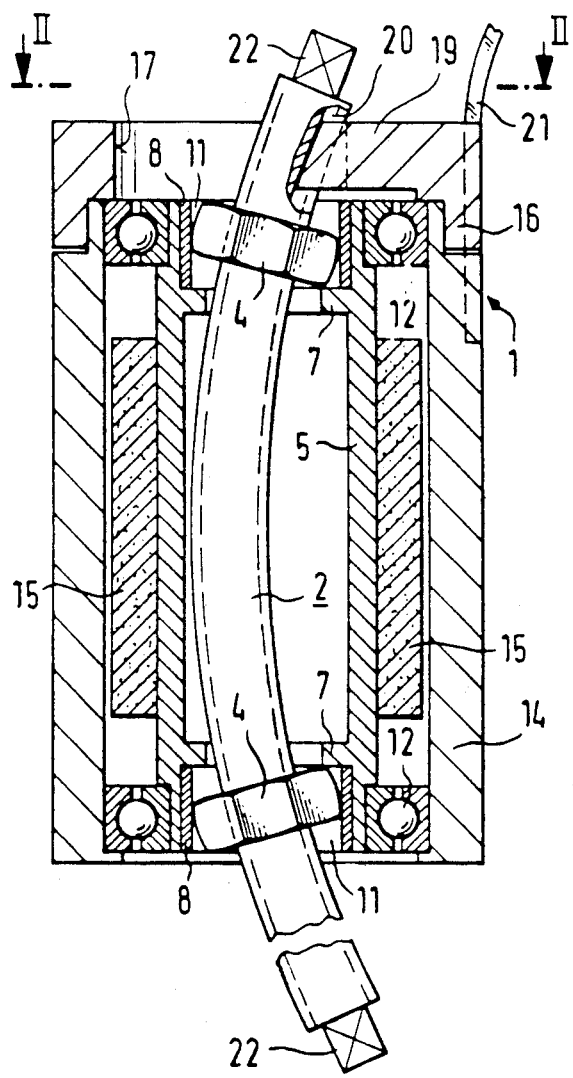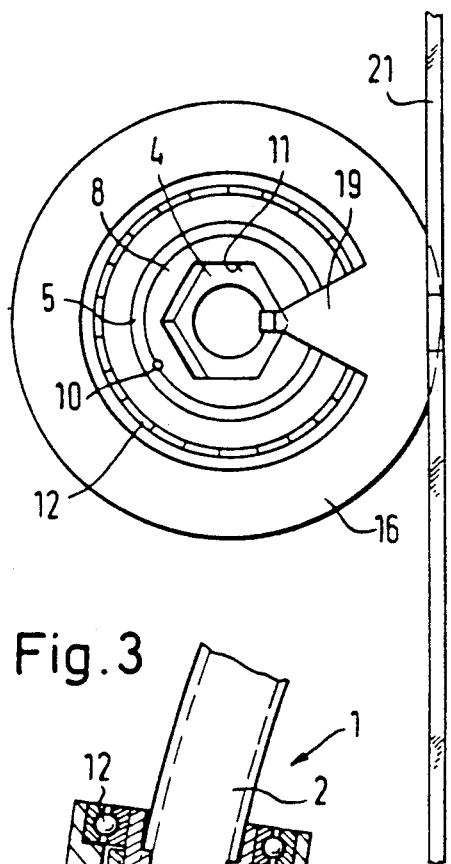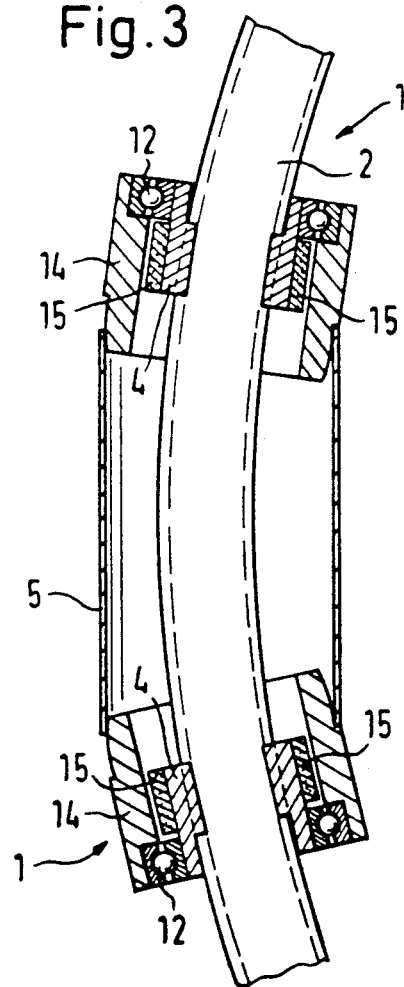

TRANSMISSION GUIDED BY STATIONARY CURVED SPINDLE

BACKGROUND OF THE INVENTION

The present invention relates to a transmission arrangement of the kind for converting the rotary movement of a motor into a linear curved movement of a driven body.

Transmission arrangements of that kind are used in particular as window lifting assemblies in motor vehicles, in which the doors, as viewed in the direction of travel, are curved convexly outwardly so that the windows must be moved along a curved path which follows the curvature of the door when they are opened or closed.

For that purpose it is known to arrange in the door a fixed electric motor driving a gear wheel or the like which engages into a cylindrical wire spiral or coil member and, upon being rotated, displaces it in the longitudinal direction. The wire spiral or coil member which has only a low degree of inherent stiffness transversely with respect to its longitudinal direction is so enclosed by a sheet metal tube which is slit in the longitudinal direction, that the wire spiral or coil member can only move back and forth in the tube. The one end of the wire spiral or coil member is rigidly connected to the window to be moved, while the element which connects those two parts together extends through the slit in the sheet metal tube. The part of the sheet metal tube in which the end of the wire spiral or coil member, which is connected to the window, moves back and forth, extends parallel to the path of movement of the window.

As only pulling or pushing forces can be applied by such an arrangement in the longitudinal direction of the sheet metal tube and the wire spiral or coil member which is guided therein, it is necessary to provide additional guide devices which carry frictional moments and lateral tilting moments of the member to be moved. That is difficult in particular when the window is to be guided only at one side, for design reasons.

So that the window stops in the respective position attained after the drive motor is switched off and cannot be pressed downwardly, generally the sheet metal tube which encloses the wire spiral or coil member is additionally wound to form at least one loop so that the cable friction as between the wire spiral or coil member and the sheet metal tube produces a self-locking effect which is independent of the motor or the engagement of the motor gear wheel into the wire spiral or coil member. However that cable friction has to be overcome in any deliberate lifting or lowering operation and therefore results in the consumption of an additional amount of power.

Another disadvantage of the known arrangement is that the sheet metal tube must be at least twice the length of the full lifting motion of the window so that the wire spiral or coil member continues to be guided in the sheet metal tube when the window is in the fully lowered position. That results in a comparatively large amount of space being required.

SUMMARY OF THE INVENTION

In comparison therewith the invention is based on the object of providing a transmission arrangement of the kind set forth in the opening part of this specification, which is of minimum structural size and which makes it possible for the member to be moved to be guided precisely along the curved path without involving additional guide means and to carry corresponding counteracting moments.

The invention therefore no longer uses a motor which is stationary in relation to the article to be moved and which drives a displaceable element (the wire spiral or coil member) which is also displaced with that article and which is of such a flexible configuration that it can admittedly adapt to the curved path but cannot perform any guide function. Instead, the arrangement provides a stationary spindle which is curved in accordance with the curved path of movement and along which the motor moves in the longitudinal direction by virtue of the rotary movement between the rotor and the stator. In that respect, in the present context, the reference to a curved spindle means an elongated curved bar or rod which is of substantially circular configuration in each of its cross-sections perpendicular to the longitudinal axis, and provided on the peripheral surface of which is at least one helical thread or flight which extends at least over the length of the path to be covered by the article to be moved. The thread pitch, pitch angle, pitch depth and cross-sectional shape of the thread flight can vary within wide limits. At any event the thread counterpart portion and therewith the motor assembly and the article to be moved are afforded such a good guidance effect, by virtue of the curved spindle, that it is substantially possible to eliminate additional guide elements. As the spindle only has to be immaterially longer than the path of movement to be covered by the article to be moved, that arrangement gives a minimum installation size. Even under compact spatial conditions, that makes it possible in many cases for the article to be guided to be supported on the spindle beneath its center of gravity or in the vicinity of that optimum support point, so that the tilting moments which occur are substantially less in comparison with an eccentric support arrangement which is very frequently required in the state of the art.

Another advantage of the transmission arrangement according to the invention arises in relation to the use thereof as a window lifting apparatus in the door of a motor vehicle: more specifically, in this case the spindle can be of such a massive construction and can be so strongly connected to the frame components of the door that it serves as an additional collision protection for the occupants of the vehicle.

An option which has been found to be particularly advantageous is one which involves the complete transmission's being mounted directly to the pane so that that transmission can be used for any kind of motor vehicle, because it is only the spindle that has to be adapted to the respective curvature.

If higher tilting moments are to be carried because it is not possible to provide for support precisely beneath the center of gravity of the article to be moved, in accordance with the invention two thread counterpart portions are screwed on to one and the same curved spindle in such a way that, in the longitudinal direction of the spindle, they are at a spacing from each other which affords a sufficiently long lever arm. The two thread counterpart portions are then either directly or indirectly connected together in such a way that they move in the longitudinal direction of the curved spindle in the same sense and at the same speed.

The direct connection of the two thread counterpart portions is effected by means of a sleeve which embraces the spindle and which also rotates with the thread counterpart portions and which preferably forms an integral component of the rotor of the electric motor. The sleeve is in the shape of a straight circular cylinder, the axis of which intersects in the form of a chord the arc formed by the center line of the curved spindle. The centers of rotation of the two thread counterpart portions are disposed at the two points of intersection.

As an alternative thereto each of the two thread counterpart portions may be a component of its own motor rotor. In that case two motors are in practice arranged on one and the same curved spindle, the stators of the motors being connected together and to the article to be moved. That connection can also be made by means of a sleeve which embraces the spindle and which in this case also may be of a configuration which departs from the straight circular-cylindrical shape.

The invention is described hereinafter by means of embodiments with reference to the drawings in which:

BRIEF DESCRIPTION OF THE DRAWINGS

FIG. 1 shows a transmission arrangement according to the invention which is integrated into the window lifting apparatus of a motor vehicle, the transmission arrangement having two thread counterpart portions which are in the form of nuts and which are connected together by a sleeve, FIG. 2 is a plan view in the direction indicated by the arrows II—II of the apparatus shown in FIG. 1, with the spindle being omitted for the sake of clarity.

FIG. 3 shows an embodiment in which two transmission arrangements according to the invention which are driven by two synchronized motors are connected together by a sleeve.

DESCRIPTION OF PREFERRED EMBODIMENTS

Figure 4:
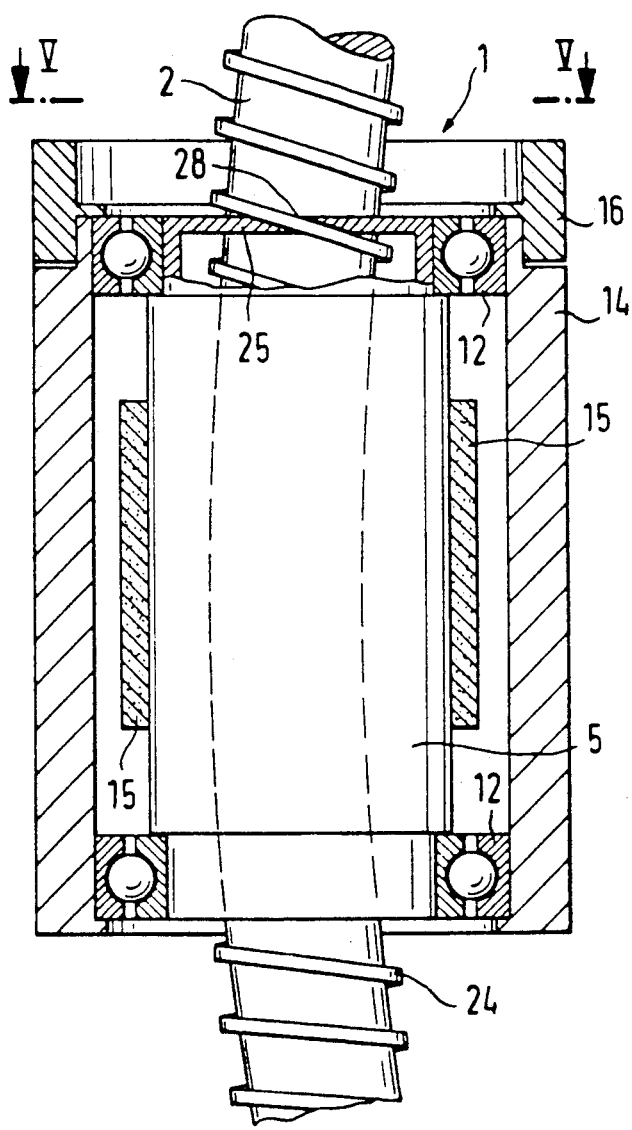
FIG. 4 shows an embodiment in which the thread counterpart portions are formed by two flat discs which are connected together by a sleeve which at the same time forms the rotor of the motor assembly.

The transmission arrangement 1 shown in FIGS. 1 and 2 essentially comprises the spindle 2, the curvature of which is shown in greatly exaggerated form for the sake of clarity, and the two thread counterpart portions which are each in the form of a hexagonal nut 4 and which are screwed at a spacing from each other on to the spindle 2 and which are connected together by a long sleeve 5.

For the purposes of making that connection, the sleeve 5 which is in the form of a straight circular cylinder is provided at its inside wall with two radially inwardly projecting shoulders 7, each of which is so arranged in the vicinity of one of the two axial ends of the sleeve 5 that its surface which faces toward that axial end is at a spacing from the end of the sleeve 5 which is approximately equal to 1.5 times the thickness of the nuts 4. From each of the axial ends, pushed into the sleeve 5 is a connecting portion 8, the outside of which is in the form of a straight circular cylinder which bears with its outer peripheral surface against the inner peripheral surface of the sleeve 5. Each of the connecting portions 8 sits with its inner axial end face against the associated shoulder 7 of the sleeve 5 and is non-rotatably connected to the sleeve by way of a pin 10 which can be seen in FIG. 2. An opening 11 which is of hexagonal cross-section extends centrally through each of the connecting portions 8, passing therethrough in the axial direction. The dimensions of the through opening 11 are matched to the outside dimensions of the hexagonal nut 4 so that the nut is non-rotatably connected to the sleeve 5 by the connecting portion 8. As can be very clearly seen from FIG. 1, because of the curvature of the spindle 2, each of the hexagonal nuts 4 must be so arranged in the through opening 11 in the associated connecting portion 8 that it is tilted relative to the longitudinal axis or the axis of symmetry of the sleeve 5. That means that, upon a rotary movement of the sleeve 5, each of the hexagonal nuts 4 performs a wobble or swash-plate-like movement relative to the sleeve 5. So that that movement can occur without serious frictional losses, the outside surfaces of the hexagonal nuts 4, which extend in the longitudinal direction, are of a spherical configuration and the cross-section of the through opening 11 is of sufficiently large size. The shoulders 7 project inwardly to such an extent that, on the one hand the sleeve 5 can rotate freely about the spindle 2, while on the other hand the nuts 4 can transmit in the axial direction to the shoulders 7 and therewith the sleeve 5, the forces which are required to displace the arrangement. The assembly may also have two such shoulders per nut so that those pressure forces can be exerted in both directions of movement.

The sleeve 5 is supported against the inside peripheral surface of a motor housing 14 which is disposed coaxially therearound, by way of two ball bearing assemblies 12 which are arranged in the region of the axial ends of the sleeve. The motor housing 14 is also substantially in the form of a straight circular cylinder and is entrained upon displacement of the nuts 4 and the sleeve 5, along the spindle 2. The motor housing 14 includes stator windings (not shown) which can be supplied with current by way of connections (also not shown). The rotary magnetic fields produced by the current flowing through the stator windings act in known manner on permanent magnets 15 mounted on the outside of the sleeve 15 in such a way that it rotates. In conjunction with the permanent magnets 15 therefore the sleeve 5 forms the rotor of an electric motor. Fitted on to the motor housing 14 at its end which is the upper end in FIG. 1 is a disc carrier 16 which is non-rotatably connected to the motor housing 14 and which is also substantially in the form of a straight circular cylinder. A straight circular-cylindrical opening 17 passes through the disc carrier 16 in the axial direction, the opening 17 permitting the spindle 2 to pass unimpededly therethrough. In the radial direction, a guide projection 19 which is integrally connected to the disc carrier 16 projects into the circular-cylindrical opening 17 to such an extent that its radially inward end engages into a guide groove 20 which is provided in the spindle 2 and which extends over almost the entire length of the spindle 2. In that way the disc carrier 16 and therewith also the motor housing 14 is non-rotatably guided on the spindle 12 slidably in the longitudinal direction thereof. In order to improve that guidance effect, the arrangement may also have a plurality of such guide projections, each of which engages into an associated guide groove. That guide arrangement only serves to prevent a rotary movement of the motor housing 14 about the spindle 2. The guidance effect for the body to be moved along the curved path is produced by the association of the entire motor assembly with the spindle 2.

Fixed to the disc carrier 16 is a window pane 21 of a motor vehicle, of which only part is shown in FIGS. 1 and 2 and which here forms the member to be moved. The square portions 22 provided at the ends of the spindle 2 serve to clamp the spindle 2 fixedly in position in the interior of a motor vehicle door. In that situation the curvature of the spindle 2 is so adapted to the curvature of the respective motor vehicle door that the window pane 21 is displaced vertically, following that curved configuration, when the motor is supplied with current and the sleeve 5 and therewith the connecting portions 8 and the hexagonal nuts 4 rotate about the central axis of symmetry of the sleeve 5.

The external screwthread of the spindle 2 and the internal screwthread of the hexagonal nuts 4 which include only a few thread pitches are so matched to each other that the different pitches of the thread portion or flight on the side which is towards the center point of the curvature on the one hand and on the side which is away from the center point of the curvature on the other hand can be accommodated by a suitably large clearance. That clearance in the screwthread configuration may of course be very small since, as already mentioned above, the curvature of the screwthreaded spindle 2 is in actual fact considerably smaller than that shown in the drawings. The spacing between the two hexagonal nuts 4 and thus the length of the sleeve 5 are so selected that the tilting moments which occur upon displacement of the window 21 can be satisfactorily accommodated and the window does not suffer from tilting and twisting.

The embodiment shown in FIG. 3 comprises two transmission arrangements 1 according to the invention, which are formed by virtue of the fact that two nuts 4 are screwed on to one and the same spindle 2, each nut 4 having a few screwthread portions and being in the form of a straight circular cylinder on its outside. Each of the two nuts 4 carries permanent magnets 15 on its outside and is supported by way of a ball bearing assembly 12 in a motor housing 14 which is also substantially in the form of a straight circular cylinder and the windings of which are once again not specifically shown. Accordingly each of the nuts 4, together with the permanent magnets 15 disposed thereon, forms the rotor of an electric motor which rotates relative to the motor housing 14 serving as a stator when the field windings thereof are supplied with current. The two transmission arrangements 1 are at a spacing in the longitudinal direction of the curved spindle 2 and are connected together by a sleeve 5 which however is not rotatable in the present case but connects together the two stators or motor housings 14. In the regions in which the motor housings 14 are fitted into the sleeve 5, the peripheral surfaces of the motor housings are of a spherical configuration in order to permit adaptation to differently curved spindles 2. In order to permit synchronous movement of the two drive arrangements and their associated motors, it can be provided that one and the same current flows through the two motors. The overall assembly can again be non-rotatably guided on the fixed spindle 2, as was described in relation to the embodiment shown in FIG. 1. Instead of the straight sleeve 5. in this case also it is possible to use a sleeve which is curved to correspond to the spindle 2, or a suitable connecting linkage or the like.

If the tilting moments to be carried are not substantial, because for example the member to be displaced can be supported precisely beneath its centre of gravity, then only one of the two transmission arrangements shown in FIG. 3 may be directly connected to the member to be guided and the sleeve 5 and the other transmission arrangement may be omitted. It will be appreciated that in that case two force-transmitting shoulders are required.

Figure 5:
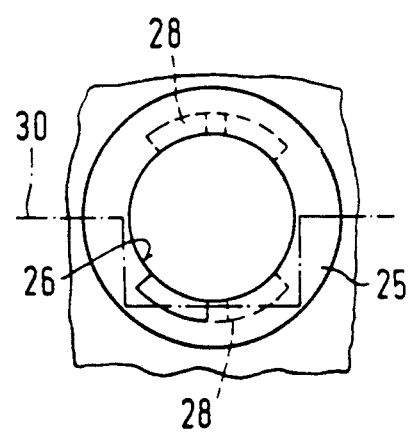
FIG. 5 is a plan view of part of the embodiment shown in FIG. 4 along line V—V, with the spindle being omitted for the sake of clarity.
Figure 6:
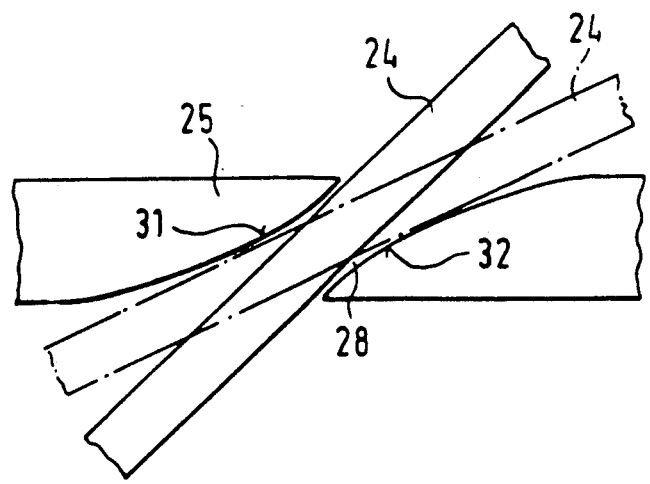
FIG. 6 shows the engagement of the screwthread pitch of the spindle in FIG. 4 into the slot in a thread counterpart portion in two different angular positions.

In the embodiment shown in FIGS. 4 through 6, the curved spindle 2 has a screwthread flight 24 of very great pitch. That makes it possible for the two thread counterpart portions of which only the upper can be seen in FIG. 4 to be in the form of flat discs which here at the same time form the terminal or axial end discs of a long sleeve 5, which is in the form of a straight circular cylinder. Each of the two flat discs 25 has a central circular opening 26 which extends therethrough and the inside diameter of which is somewhat larger than the outside diameter of the core of the screwthread on the spindle 2. Extending radially outwardly from the opening 26 is a slot 28 which, extending inclinedly, as viewed from the side, connects the underside of the flat disc 25 to the top side thereof. The dimensions of the slot 28 and in particular its radial depth are so selected that the thread flight 24 can engage into same and can extend through same from one side of the flat disc 25 to the other. As can be seen in particular from FIG. 5, the slot 28 which is shown at the top in FIG. 5, of the flat disc 25 which is at the bottom in FIG. 4, is displaced through 180° relative to the slot 28 of the flat disc 25 which is at the top in FIG. 4. That provides that, in the event of a rotary movement of the sleeve 5 in the course of which the two slots, moving along the screwthread 24, move around the spindle 2, the spacing between the two discs 25 can always remain the same. The dash-dotted line 30 in FIG. 5 shows the location of the section in FIG. 4.

In this embodiment it can be particularly clearly seen that the pitch on the side of the curved spindle 2, which is towards the center point of the curvature, is smaller than on the side which is away from the center point of the curvature. The result of that is that the screwthread 24 extends substantially more steeply on the side which is towards the center point of the curvature than on the opposite side, as is shown in greatly exaggerated view in FIG. 6. FIG. 6 shows the configuration of the screwthread 24 on the side towards the center point of the curvature, in solid lines, while it is shown by dash-dotted lines on the side which is remote from the center point of the curvature. It will be seen that the slot 28 in the flat disc 25 is so provided with rounded-off walls 31, 32 that in both limit positions the screwthread 24 can pass through the slot 28 and has adequate guidance in that situation against the walls 31, 32 of the slot. The rounded walls 31, 32 are of a spherical configuration in the second dimension so that the different inclinations of the screwthread on the inside and outside of the spindle still do not have any influence.

Moreover in this embodiment also the sleeve 5 is supported by way of two ball bearing assemblies 12 on a motor housing 14 which is in the form of a straight circular cylinder and which has stator windings (not shown) which, when current flows therethrough, apply to the permanent magnets 15 which are non-rotatably connected to the sleeve 5, a force for causing the sleeve 5 to rotate. In this case also a head corresponding to the disc carrier 16 is mounted at the top side of the motor housing 14; the article to be moved can be connected to said head. The assembly also includes a guide means (not shown) which prevents rotary movement of the motor housing 14 and the head 16 about the curved spindle 2 while, however, permitting longitudinal displacement of those components.

What is claimed is:

1. An actuating arrangement for producing a movement of a displaceable member (21) along a curved path comprising: a motor comprising a stator (14) adapted to be connected to said displaceable member (21) and a rotor (5, 15); a spindle (2) which in use of the arrangement is disposed stationarily and is curved to correspond to the configuration of said curved path, the spindle (2) having a screwthread means (24) thereon; at least one nut means (4, 25) providing a screwthread configuration in rotatable screwthreading engagement with the screwthread means (24) on the spindle (2), the nut means (4, 25) being non-rotatably connected to said motor rotor (5, 15) whereby rotation of said motor rotor (5, 15) upon actuation of the motor causes rotary movement of said nut means (4, 25) about said spindle (2), and said rotary movement of said nut means (4, 25) in conjunction with the co-operation between the screwthread means (24) on the spindle (2) and the screwthread configuration of the nut means (14, 25) causes said stator (14) and therewith said displaceable member (21) to be displaced along said spindle (2).

2. A transmission arrangement for converting the rotary movement of a motor into a linear movement of a driven member along a curved path comprising: a stationarily arranged spindle (2) which is curved to correspond to the shape of the curved path, the spindle (2) having a screwthread means (24) thereon; and at least one thread counterpart portion (4; 25) which provides a screwthread configuration in engagement with the screwthread means (24) of the spindle (2) and which is rotatable about the spindle (2) and is displaceable in the longitudinal direction of the spindle (2), wherein a stator (14) of the motor is adapted to be connected to the driven member (21) and is mounted non-rotatably and longitudinally displaceably with respect to the curved spindle (2), and a rotor (5, 15) of the motor is adapted to be non-rotatably connected to said thread counterpart portion (4; 25).

3. A transmission arrangement as set forth in claim 2 wherein the spindle (2) is at least substantially uniformly curved over its entire length.

4. A transmission arrangement as set forth in claim 2 wherein the thread counterpart portion is in the form of a nut (4) comprising only a few thread pitches.

5. A transmission arrangement as set forth in claim 4 wherein the nut (4) forms at the same time the rotor (4 and 15) of the motor.

6. A transmission arrangement as set forth in claim 2 wherein the thread counterpart portion is in the form of a disc (25), the thickness of which is substantially smaller than the thread pitch of the screwthread of the spindle (2) and which has a central opening (26) embracing the spindle (2), the inside diameter of the opening (26) being slightly greater than the diameter of the core of the spindle (2), and the opening (26) being adjoined by a radial slot (28), the slot extending from the underside of the disc (25) inclinedly to the top side thereof and a short portion of the thread flight (24) of the spindle (2) engaging into the slot (28) in any position of the disc (25).

7. A transmission arrangement as set forth in claim 2 comprising first and second thread counterpart portions (4; 25) which are at a spacing in the longitudinal direction of the spindle (2), and further including a sleeve (5) disposed around the spindle (2) and connecting the first and second thread counterpart portions together.

8. A transmission arrangement as set forth in claim 7 wherein said sleeve (5) forms the rotor of the motor and each of the thread counterpart portions is in the form of a nut (4) non-rotatably connected to the sleeve (5) and capable of performing a tilting movement relative to the sleeve (5).

9. A transmission arrangement as set forth in claim 2 comprising first and second thread counterpart portions (4) which are at a spacing in the longitudinal direction of the spindle (2) and which form the rotors (4, 5) of respective motors, the motors having respective stators (14) at a spacing from each other in the longitudinal direction of the spindle (2), and further including a sleeve (5) connected to the stators (14) of the motors, actuation of the motors producing synchronous rotary movement of the thread counterpart portions (4).

10. A transmission arrangement as set forth in claim 2 and comprising first and second thread counterpart portions (4; 25) which are at a spacing in the longitudinal direction of the spindle (2), and further including a sleeve (5) disposed around the spindle (2) and connecting the first and second thread counterpart portions together, wherein each thread counterpart portion is in the form of a disc (25), the thickness of which is substantially smaller than the thread pitch of the screwthread of the spindle (2) and which has a central opening (26) embracing the spindle (2), the inside diameter of the opening (26) being slightly greater than the diameter of the core of the spindle (2), and the opening (26) being adjoined by a radial slot (28), the slot extending from the underside of the disc (25) inclinedly to the top side thereof and a short portion of the thread flight (24) of the spindle (2) engaging into the slot (28) in any position of the disc (25), and wherein the discs (25) are non-rotatably connected to the sleeve (5) so that the slots (28) thereof are displaced through 180° relative to each other.

11. A transmission arrangement as set forth in claim 2 wherein the stator (14) is non-rotatably guided on the spindle (2).

12. A transmission arrangement as set forth in claim 2 wherein the stator (14) is adapted to be directly connected to said member (21) to be moved.

* * * * *